US012744488B2

(12) United States Patent
Fan et al.

(10) Patent No.: US 12,744,488 B2
(45) Date of Patent: Sep. 22, 2026

(54) SI-BASED THERMOPHOTOVOLTAIC CELL WITH INTEGRATED AIR BRIDGE

(71) Applicant: The Regents of The University of Michigan, Ann Arbor, MI (US)

(72) Inventors: Dejiu Fan, Ann Arbor, MI (US); Tobias Burger, Ann Arbor, MI (US); Byungjun Lee, Ann Arbor, MI (US); Andrej Lenert, Ann Arbor, MI (US); Stephen R. Forrest, Ann Arbor, MI (US)

(73) Assignee: The Regents of The University of Michigan, Ann Arbor, MI (US)

( * ) Notice: Subject to any disclaimer, the term of this patent is extended or adjusted under 35 U.S.C. 154(b) by 0 days.

(21) Appl. No.: 18/853,895

(22) PCT Filed: Apr. 20, 2023

(86) PCT No.: PCT/US2023/019229

§ 371 (c)(1),
(2) Date: Oct. 3, 2024

(87) PCT Pub. No.: WO2023/244298

PCT Pub. Date: Dec. 21, 2023

(65) Prior Publication Data

US 2025/0233541 A1 Jul. 17, 2025

Related U.S. Application Data

(60) Provisional application No. 63/332,875, filed on Apr. 20, 2022.

(51) Int. Cl.
*H02S 10/30* (2014.01)
*H02S 40/22* (2014.01)

(52) U.S. Cl.
CPC .............. *H02S 10/30* (2014.12); *H02S 40/22* (2014.12)

(58) Field of Classification Search
CPC .......... H02S 10/30; H02S 40/22; H10F 77/63; H10F 77/67
See application file for complete search history.

(56) References Cited

U.S. PATENT DOCUMENTS 6,034,321 A * 3/2000 Jenkins .................. H10F 10/11 438/57
2008/0041443 A1 2/2008 O'Connell et al.
(Continued)

FOREIGN PATENT DOCUMENTS

WO WO-2021043918 A1 3/2021

OTHER PUBLICATIONS

Fan et al. "Near-perfect photon utilization in an air-bridge thermophotovoltaic cell". Nature, vol. 586, 237. Published online: Sep. 21, 2020. (Year: 2020).*
(Continued)

*Primary Examiner* — Lindsey A Buck
(74) *Attorney, Agent, or Firm* — Harness, Dickey & Pierce, P.L.C.

(57) ABSTRACT

Techniques are presented for fabricating optoelectronic devices with integrated air bridges for improved efficiency. The optoelectronic device includes: a reflector disposed on the substrate; a spacer layer disposed on the reflector; and a thermophotovoltaic cell disposed on to the spacer layer, such that the spacer layer is arranged between the reflector and the thermophotovoltaic cell and the spacer layer includes a cavity which extends between the reflector and the thermo-photovoltaic cell. Of note, the thermophotovoltaic cell is comprised of silicon material with one or more lateral p-n junctions formed therein.

7 Claims, 7 Drawing Sheets

(56) References Cited

U.S. PATENT DOCUMENTS

| | | | | |
|---|---|---|---|---|
| 2011/0198570 | A1* | 8/2011 | Venkatasubramanian .................. | H10F 10/16 257/30 |
| 2015/0372634 | A1 | 12/2015 | Greiff et al. | |
| 2019/0036473 | A1 | 1/2019 | Sablon et al. | |
| 2021/0328087 | A1 | 10/2021 | Burger et al. | |
| 2022/0328701 | A1* | 10/2022 | Luque Lopez ....... | H10F 77/937 |

OTHER PUBLICATIONS

Swanson et al. "Silicon Photovoltaic Cells in TPV Conversion". Interim Report, Dec. 1979. Stanford University. (Year: 1979).*

International Search Report of the ISA issued in PCT/US2023/019229, mailed Feb. 8, 2024; ISA/KR.

* cited by examiner

Spin PR on top

Thin bottom surface

Thin bottom surface

Pattern metal remove bottom PR

Cold-weld bonding

SI-BASED THERMOPHOTOVOLTAIC CELL WITH INTEGRATED AIR BRIDGE

CROSS-REFERENCE TO RELATED APPLICATIONS

This application is a 371 U.S. National Phase of International Application No. PCT/US2023/019229, filed on Apr. 20, 2023, which claims the benefit of U.S. Provisional Application No. 63/332,875, filed Apr. 20, 2022. The entire disclosures of the above applications are incorporated herein by reference.

GOVERNMENT CLAUSE

This invention was made with government support under 2018572 awarded by the National Science Foundation and under W911NF-19-1-0279 awarded by U.S. Army Research Office. The government has certain rights in the invention.

FIELD

The present disclosure relates to thermophotovoltaic cells and to techniques for fabricating optoelectronic devices with integrated air-bridges for improved efficiency.

BACKGROUND

Thermophotovoltaic cells (TPVs) are used to scavenge excess heat energy from high temperature source such as furnaces, engines or turbines, etc. by converting radiated photons from the hot emitter by blackbody radiation into electricity. Unlike photovoltaic (PV) devices, emitter temperature depends on the heat source, and the distance between the cell and the heat source can be within close proximity. Therefore, engineering the reflectivity of the cell can help improve the power conversion efficiency by minimizing the energy loss from unabsorbed out-of-band (OOB) photons.

Previously, thermophotovoltaic cells comprised of InGaAs and with air-bridge back surface reflector was reported, with PCE improvement from 24% to 32% compared to the same cell with gold back reflector. It is desirable, however, to construct thermophotovoltaic cells using higher bandgap materials, such as silicon. Use of silicon can overcome the potential limits of scalability and expensive manufacturing cost for conventional TPV materials such as indium gallium arsenide (InGaAs) or indium antimonide (InSb).

This section provides background information related to the present disclosure which is not necessarily prior art.

SUMMARY

This section provides a general summary of the disclosure, and is not a comprehensive disclosure of its full scope or all of its features.

An optoelectronic device is provided with an integrated air bridge for improved efficiency. The optoelectronic device includes: a substrate; a reflector disposed on the substrate; a spacer layer disposed on the reflector; and a thermophotovoltaic cell disposed on to the spacer layer. The spacer layer is arranged between the reflector and the thermophotovoltaic cell and the spacer layer includes a cavity which extends between the reflector and the thermophotovoltaic cell. The thermophotovoltaic cell is configured to convert radiating thermal energy incident thereon into electrical energy.

In one embodiment, the thermophotovoltaic cell is comprised of silicon material with one or more lateral p-n junctions formed therein.

In another aspect, a method is presented for fabricating an optoelectronic device. The method includes: providing a silicon wafer for fabricating a thermophotovoltaic cell; forming one or more lateral p-n junctions in the silicon wafer by diffusing a first dopant into a first set of select areas of a top surface of the silicon wafer to thereby form positive areas, and diffusing a second dopant into a second set of select areas of the top surface of the silicon wafer to thereby form negative areas; patterning metal contacts over each of the positive areas and the negative areas of the one or more lateral p-n junctions; reducing thickness of the silicon wafer after the step of patterning metal contacts; depositing a reflecting material onto a host substrate; depositing a spacer layer over top of the reflecting material on the host substrate; patterning the spacer layer to form one or more holes in the spacer layer; and bonding the silicon wafer to the spacer layer, such that the one or more holes in the spacer layer form corresponding cavities between the silicon wafer and the reflecting material.

In one embodiment, the one or more lateral p-n junctions are formed by applying a mask to the top surface of the silicon wafer and patterning the mask to expose the first set of select areas and the second set of select areas on the top surface of the silicon wafer using deep reactive-ion etching before diffusing the first set of select areas and diffusing the second set of select area on the top surface of the silicon wafer.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1A:
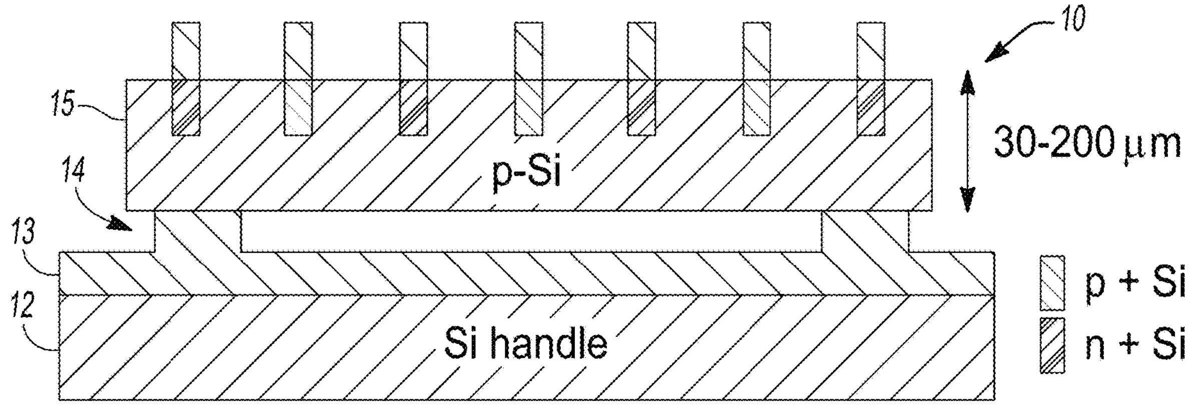
FIGS. 1A and 1B depict an example optoelectronic device with a lateral p-n junction structure and a vertical p-n junction structure, respectively.

Example embodiments will now be described more fully with reference to the accompanying drawings.

FIGS. 1A-1D depict an example optoelectronic device 10. The optoelectronic device 10 is comprised generally of a substrate 12, a reflector 13, a spacer layer 14 and a thermophotovoltaic cell 15. While reference is made to a thermophotovoltaic cell, the techniques set forth here are applicable to other types of devices as well.

More specifically, the reflector 13 is disposed on the substrate 12. In the example embodiment, the reflector is a layer of gold having a thickness on the order of 200 nm although other types of metals and reflective materials are contemplated by this disclosure. The substrate is preferably formed from silicon with a thickness on the order of 550 μm. The spacer layer 14 is positioned between the thermophotovoltaic cell 15 and the reflector 13. In the example embodiment, the spacer layer 14 is disposed on the reflector 13 and includes one or more cavities (holes) extending between the reflector 13 and the thermophotovoltaic cell 15. In the example embodiment, the one or more cavities are filled with air. In other embodiments, the one or more cavities are filled with magnesium fluoride or other types of semiconductor materials.

Figure 1B:
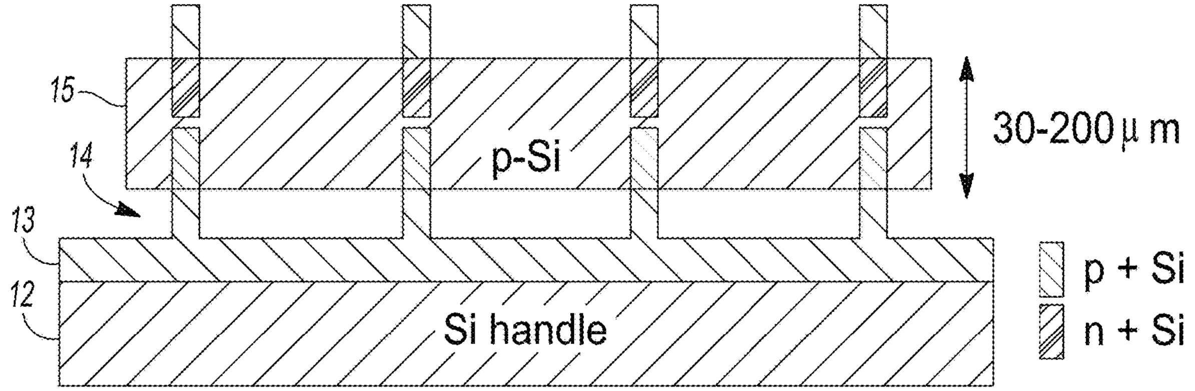
Figure 1C:
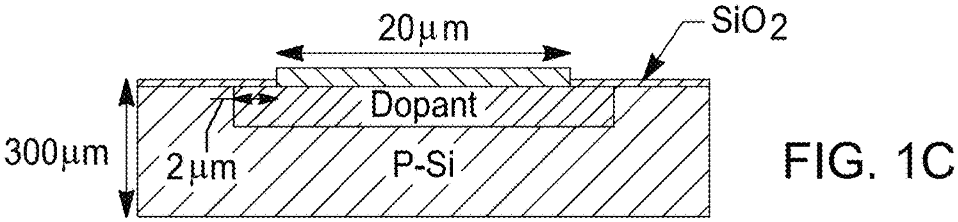
FIG. 1C is a cross-sectional side view of the thermophotovoltaic cell with a lateral p-n junction.
Figure 1D:
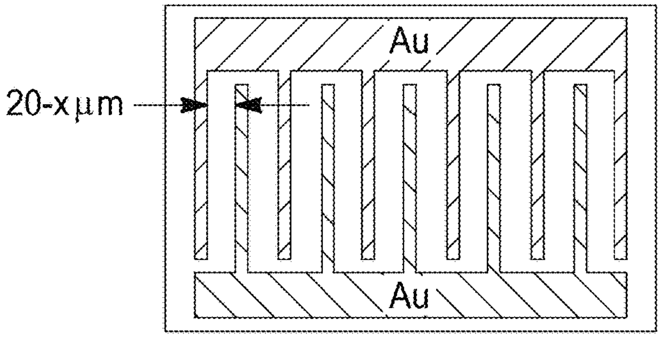
FIG. 1D is a top view of the thermophotovoltaic cell with a lateral p-n junction.

The thermophotovoltaic cell 15 is disposed on the spacer layer 14. In the example embodiment, the thermophotovoltaic cell 15 is comprised of silicon material with one or more p-n junctions formed therein. The thermophotovoltaic cell 15 operates to convert radiating thermal energy incident thereon into electrical energy. To minimize the background absorption, the silicon material for the thermophotovoltaic cell 15 has a thickness in the range of 30-200 μm. As the dopant implantation or diffusion can be problematic for thin substrates, the thermophotovoltaic cell 15 preferably uses a lateral p-n junction structure as seen in FIG. 1A. In the example embodiment, the positive area of the silicon is doped with boron and the negative area is doped with phosphorus. In other embodiments, the thermophotovoltaic cell 15 uses a vertical p-n junction structure as shown in FIG. 1B.

Figures 2A, 2B, 2C, 2D, 2E, 2F, 2G, 2H, 2I:
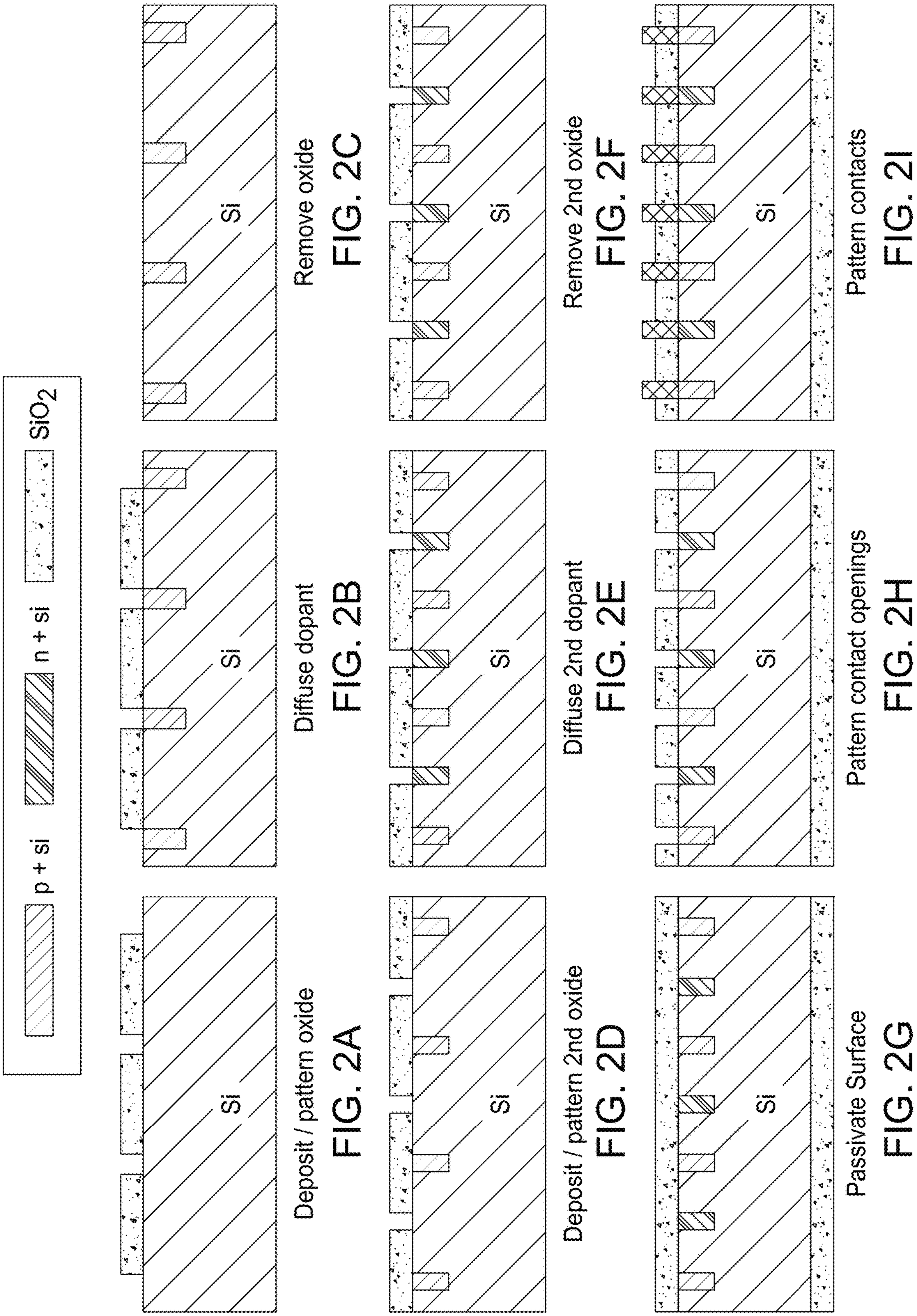
FIGS. 2A-2I are diagrams depicting the fabrication process of an example thermophotovoltaic cell.

Fabrication process for the optoelectronic device 10 is further described in relation to FIGS. 2A-2I and 3A-3E. First, a thermophotovoltaic cell 15 having lateral p-n junctions is formed as shown in FIGS. 2A-2I. In the example embodiment, a double side polished, 1-10 Ω·cm, 300 μm thick silicon wafer was used for fabrication. One or more lateral p-n junctions are formed in the silicon wafer by diffusing a first dopant into a first set of select areas of a top surface of the silicon wafer to thereby form positive areas as seen in FIGS. 2A-20, and diffusing a second dopant into a second set of select areas of the top surface of the silicon wafer to thereby form negative areas as seen in FIGS. 2D-2F. Before diffusing the first set of select areas, a mask is applied to the top surface of the silicon wafer and the mask is patterned to expose the first set of select areas, for example using deep reactive-ion etching. Likewise, before diffusing the second set of select areas, a second mask is applied to the top surface of the silicon wafer and the mask is patterned to expose the second set of select areas on the top surface of the silicon wafer.

In this example, thermal oxide and low-pressure, high temperature (900° C.) chemical vapor deposition (CVD) oxide was used as masking oxide for the first dopant and the second dopant, respectively. Both oxide layers were patterned using deep reactive-ion etching (DRIE) for dopant diffusion. For p+ doping, boron was diffused under 1050 C for 2 hours using a GS139 solid boron source. For n+ doping, phosphorus was diffused under 950 C for 30 min using POCL phosphorus source.

Next, metal contacts were patterned over each of the positive areas and the negative areas of the lateral p-n junctions as seen in FIGS. 2G-2I. For surface passivation, 20 nm plasma-enhanced CVD oxide was used, and patterned using photolithography and wet etching for contact opening. In this example, Ti/Pt/Al/Pt/Au (5/30/1500/30/200 nm) was used for metal contacts.

Figures 3A, 3B, 3C, 3D, 3E:
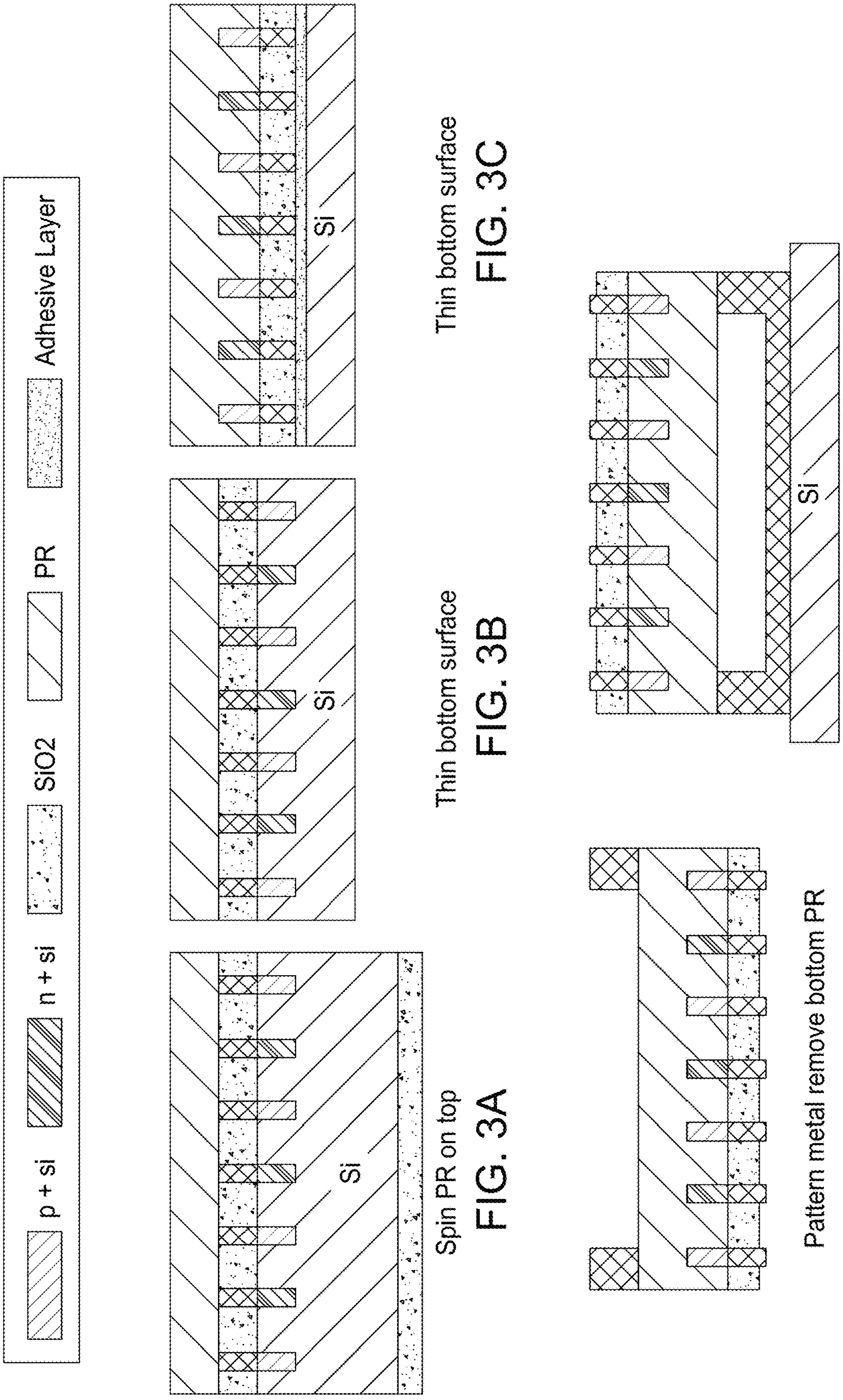
FIGS. 3A-3E are diagrams showing assembly of the optoelectronic device.

FIGS. 3A-3E further illustrate the assembly of the optoelectronic device 10. In FIG. 3A, a photoresist is applied over the metal contacts. The photoresist (e.g., SPR220 (3.0)) was spun on the top surface to protect the top contact metals during future processing. The thickness of the silicon wafer is then reduced, for example by etching the bottom surface of the silicon wafer as shown in FIG. 3B. In one example, the bottom surface of the silicon wafer was thinned down to ~90 μm after 10-11 minutes of HF-nitric etching using 3:1:1 (Nitric acid:Acetic acid:HF) solution. Chemo-mechanical polishing (CMP) could also be used for thinning the wafer. After thinning down, the wafer was cleaved into TPV cells and then mounted onto a secondary handle (e.g., 550 μm thick si wafer) using an adhesion layer as seen in FIG. 3C.

For the host structure, a reflecting material is deposited onto a host substrate and a spacer layer is deposited over top of the reflecting material. The spacer layer is then patterned to form the one or more holes in the spacer layer. In this example, standard photolithography was used to pattern the spacer layer which was comprised of 5/500 nm Ti/Au.

Lastly, the thermophotovoltaic cell is bonded to the host structure, such that the holes in the spacer layer form cavities between the silicon wafer and the reflecting material as seen in FIG. 3E. Before bonding, the host structure is preferably submerged in removerPG for metal lift-off and adhesion layer removal. In one example, the thermophotovoltaic cell is bonded to the host structure using cold-welding at 150° C., 200 kPa and 1 atm for 3 min.

Figure 4A:
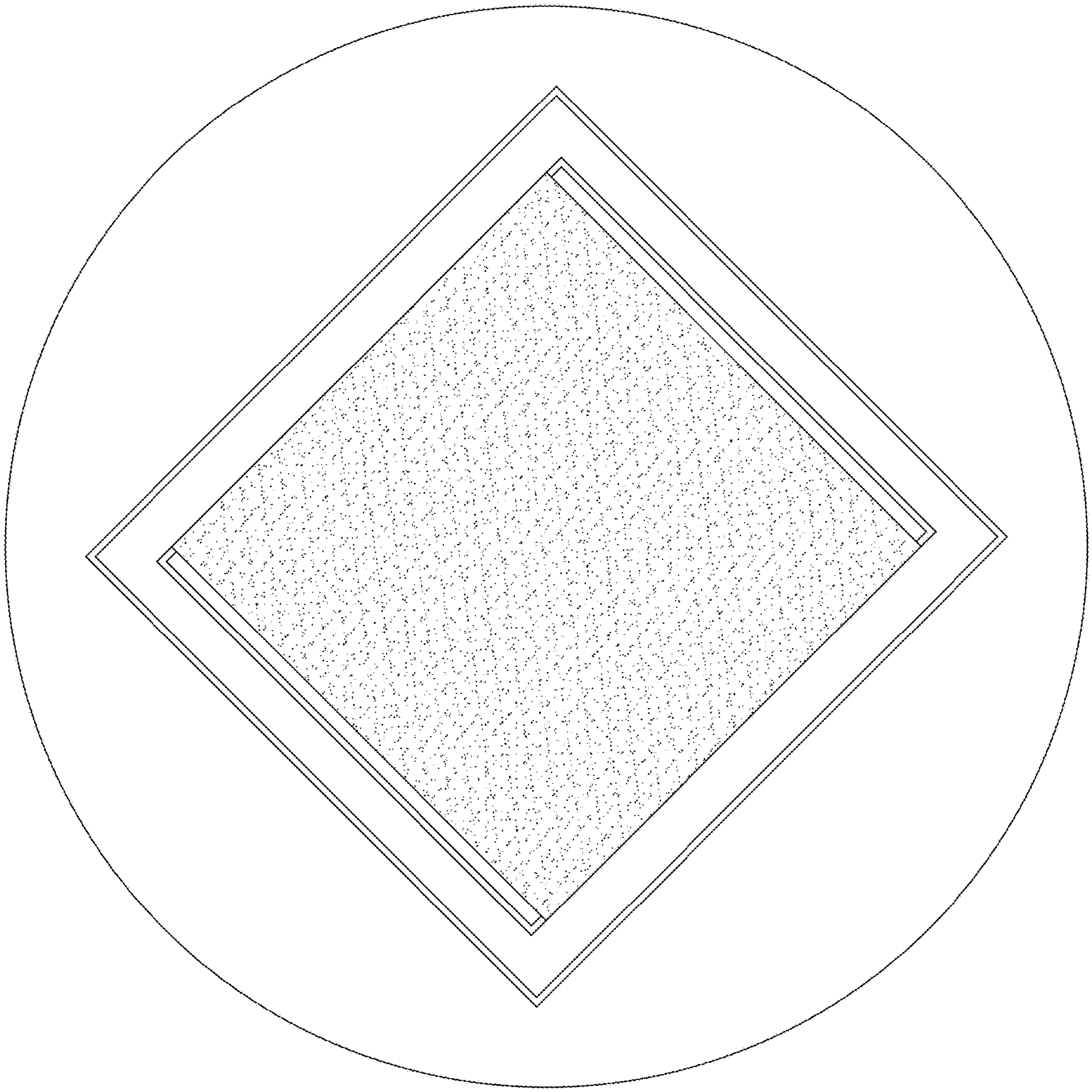
FIG. 4A is an image of a prototype of a thermophotovoltaic cell.
Figure 4B:
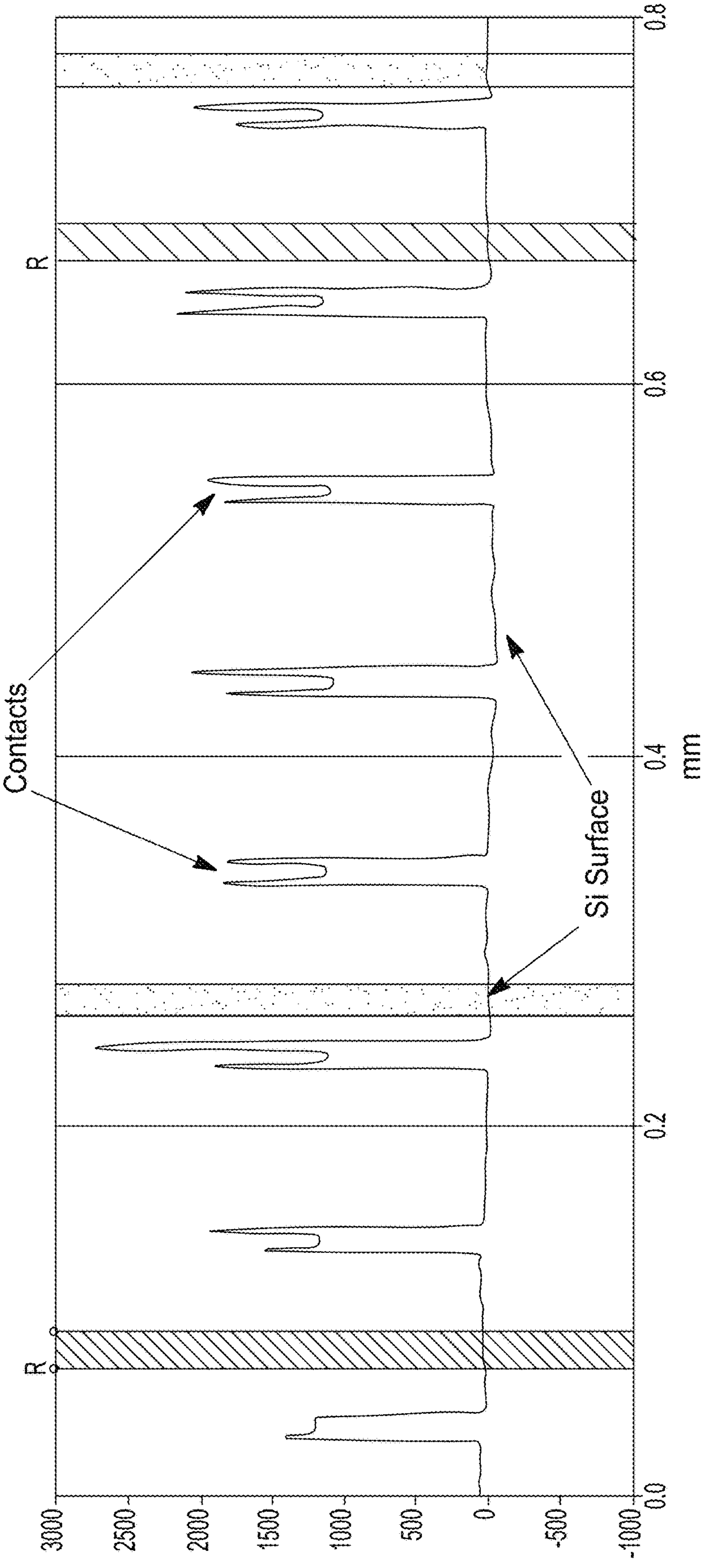
FIG. 4B is a graph showing FTIR measurements for the thermophotovoltaic cell shown in FIG. 4A.

For bonding, the wafer does not necessarily need to be cleaved after the thinning. FIG. 4A shows a prototype of large-area air-bridge thermophotovoltaic cell. 7 cm×7 cm square area is bonded onto 4-inch diameter Si wafer coated with Au. With reference to FIG. 4B, profilometry on a part of the sample shows how flat the surface is after the bonding.

Figure 5A:
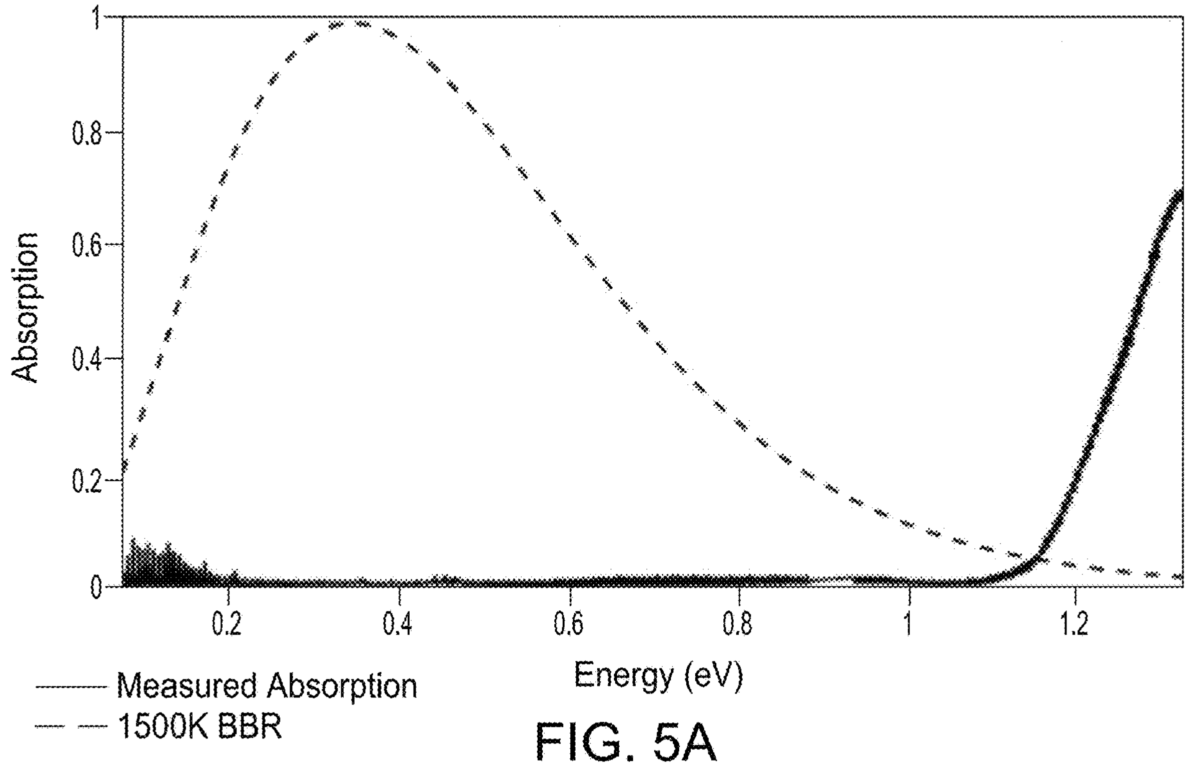
FIGS. 5A and 5B are graphs showing FTIR measurements on a thermophotovoltaic cell having 30 μm thick silicon and 90 μm thick silicon, respectively.
Figure 5B:
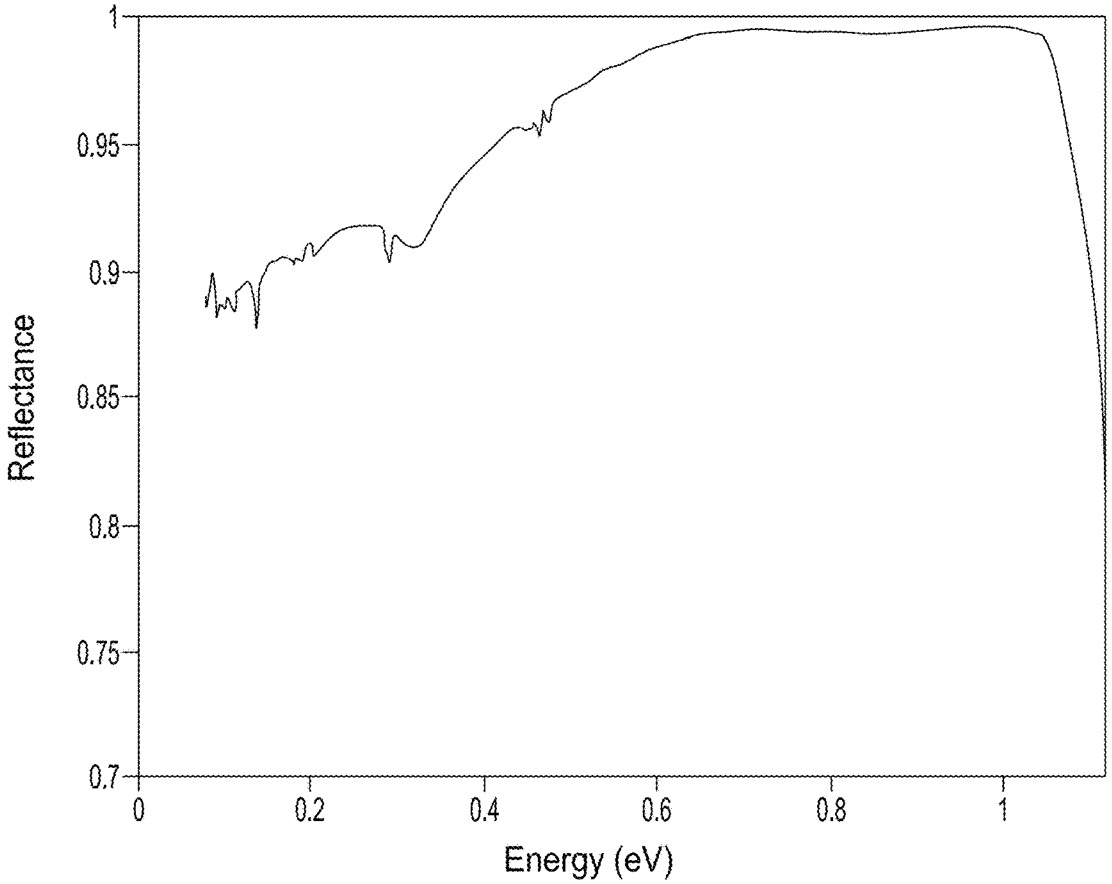

For thermophotovoltaic applications, out-of-band reflectivity and series resistance of the cell plays an important role in achieving high PCE. A Fourier transform infrared was measured on 30 μm thick bare Si with air-gap structure as a baseline, showing 99.2% OOB reflectance for 1200° C. blackbody source. A measured spectrum (blue curve) and 1500K blackbody spectrum (black dashed curve) is shown in FIG. 5A. FTIR measurement on the actual silicon-based thermophotovoltaic cell is shown in FIG. 5B. Slight increase in parasitic absorption was observed potentially due to free carrier absorption from the p+ and n+ doped region. Estimated OOB reflectance for 2000K and 2300K blackbody source is 96.4% and 96.8%, respectively.

Figure 6A:
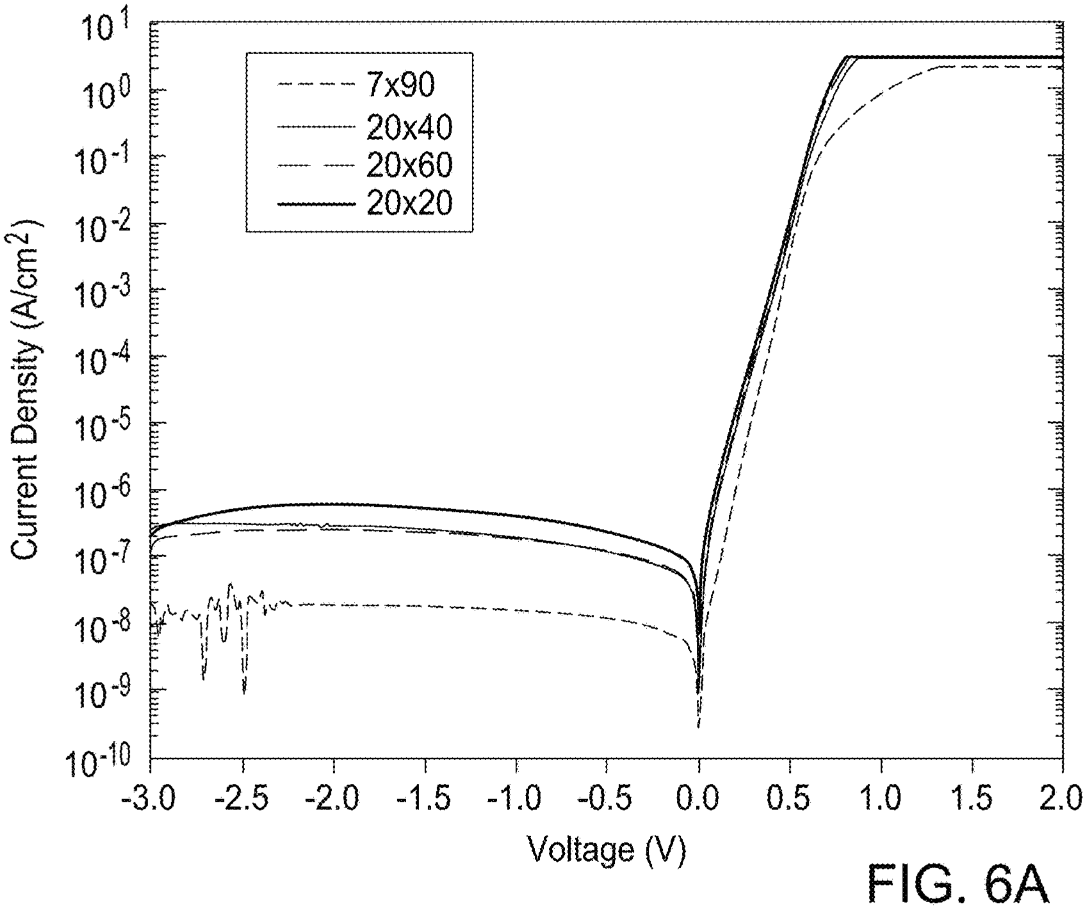
FIG. 6A is a graph showing dark J-V measurements on the thermophotovoltaic cell.
Figure 6B:
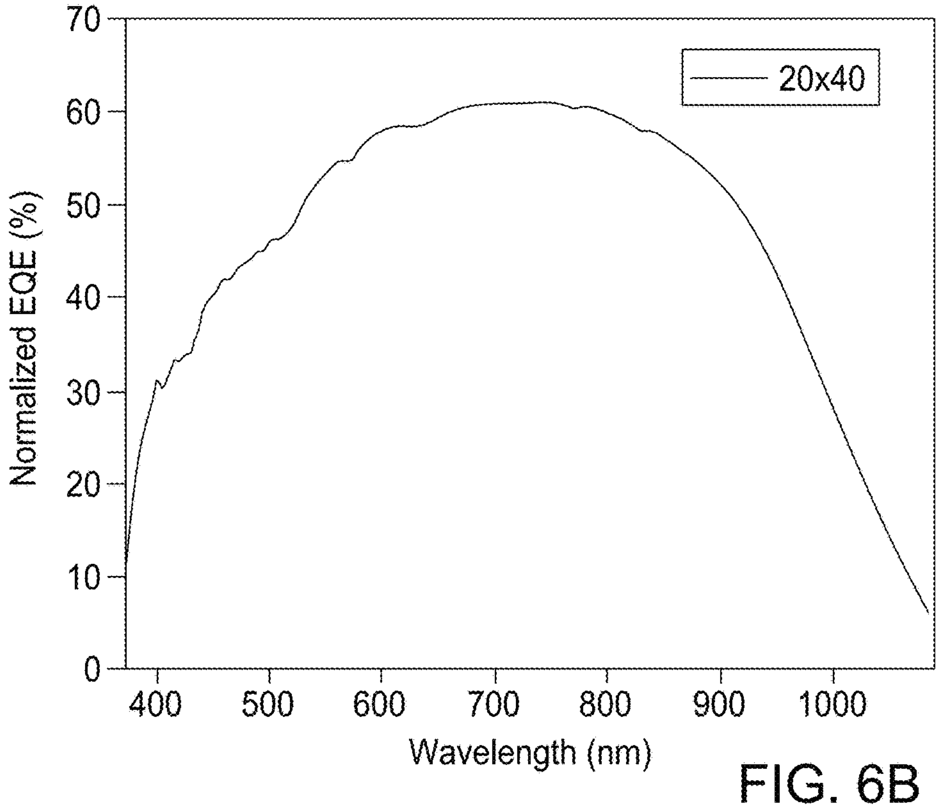
FIG. 6B is a graph showing external quantum efficiency (EQE) measurements on the thermophotovoltaic cell.

Minimizing the series resistance of the cell is also critical as TPVs operate at very high current density, which can go up to ~1 A/cm2. Various grid width and distance was tested to minimize the series resistance as shown in FIG. 6A. The first number in the legend indicates the grid width and second number indicates the grid spacing. As shown in the graph, 7 μm width and 90 μm spacing grid starts to get affected by series resistance loss after ~100 mA/cm2, with extracted Rs=250 mΩ·cm2. By increasing the grid width to 20 μm and changing the grid spacing, series resistance was improved to 43 mΩ·cm2, 59 mΩ·cm2, and 94 mΩ·cm2 for 20 μm, 40 μm and 60 μm spacing devices, respectively. FIG. 6B shows EQE measurement normalized to the ratio of open area to the total area. This well agrees with the literature value of typical flat Si PV cell without optical structure.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. An optoelectronic device, comprising:

a substrate;

a reflector disposed on the substrate;

a spacer layer disposed on the reflector;

a thermophotovoltaic cell disposed on to the spacer layer, such that the spacer layer is arranged between the reflector and the thermophotovoltaic cell and the spacer layer includes a cavity which extends between the reflector and the thermophotovoltaic cell;

wherein the thermophotovoltaic cell is comprised of silicon material with a series of p-n junctions formed in a top surface of the silicon material, where each p-n junction includes a region of p-type semiconductor material disposed laterally adjacent to a region of n-type semiconductor material; and metal contacts disposed on the thermophotovoltaic cell, such that a metal contact is disposed respectively on top of each p-n junction in the series of the p-n junctions.

2. The optoelectronic device of claim 1 wherein the thermophotovoltaic cell is configured to convert radiating thermal energy incident thereon into electrical energy.

3. The optoelectronic device of claim 1 wherein each of the p-n junctions includes a positive area of the silicon doped with boron and a negative area doped with phosphorus.

4. The optoelectronic device of claim 1 wherein the silicon material has a thickness in a range of 30 to 200 μm.

5. The optoelectronic device of claim 1 wherein the reflector is gold.

6. The optoelectronic device of claim 1 wherein the cavity is filled with one of air or magnesium fluoride.

7. The optoelectronic device of claim 1 wherein the thermophotovoltaic cell is bonded to the spacer layer using cold weld bonding.

* * * * *